United States Patent Office 3,248,315
Patented Apr. 26, 1966

3,248,315
THIOL PRODUCTION
Paul F. Warner and James W. Stanley, Phillips, Tex.,
assignors to Phillips Petroleum Company, a corporation of Delaware
No Drawing. Filed July 6, 1964, Ser. No. 380,685
3 Claims. (Cl. 204—162)

This application is a continuation-in-part of application Serial No. 143,591, filed October 9, 1961, now abandoned.

This invention relates, broadly, to the production of cyclic thiols. In accordance with one aspect, this invention relates to an improved process for the preparation of pinanyl mercaptans. In another aspect, this invention relates to novel pinanyl mercaptans.

In accordance with this invention, it has been found possible to obtain a relatively pure cyclic mercaptan in high yield with but slight formation of thioethers by effecting a reaction between bicyclic terpene compounds and hydrogen sulfide in the presence of ultraviolet light.

Accordingly, an object of this invention is to provide an improved process for the preparation of thiols from bicyclic terpene compounds.

Another object of this invention is to provide a commercially practical process for the production of pinanyl mercaptans in high yields.

A further object of this invention is to provide novel pinanyl mercaptans.

A still further object is to provide the art with high purity novel pinanyl mercaptans.

Other objects, aspects, as well as the several advantages of this invention will be apparent to those skilled in the art on a further study of the specification and the appended claims.

According to the invention set forth in said copending application, we provide an improved process for the preparation of high purity cyclic thiols in high yields which comprises contacting at least one mono-unsaturated bicyclic terpene compound with $H_2S$ under the influence of ultraviolet light for a period of time sufficient to form said thiol and recovering said thiol thus produced as a product of the process.

The mono-unsaturated cyclic terpene compounds employed according to the invention of said copending application generally contain at least 10 carbon atoms per molecule and include mixtures of one or more of these bicyclic terpene compounds. The bicyclic terpene compounds as exemplified by pinene are preferred. The bicyclic terpene compounds that can be employed can contain hydrocarbon substituents or radicals or other substituents that do not interfere with the reaction of $H_2S$ with the terpene compound. Representative examples of suitable bicyclic terpene compounds that can be employed alone or in admixture with each other include alpha-pinene, beta-pinene, camphene, alpha-thujene, beta-thujene, sabinene, carene, and the like. The above-mentioned bicyclic terpene compounds can contain one or more alkyl radicals, for example, containing up to and including 6 carbon atoms in each alkyl group as substituents.

The bicyclic terpene compounds that can be employed need not be in the form of pure compounds in order to be reacted with $H_2S$ in accordance with this invention for the production of mercaptan derivatives, but the compounds can be reacted in crude form. Thus, in place of the several pure terpene compounds, crude natural mixtures of terpene compounds can be used, or various fractions distilled from these mixtures can be used without the necessity of isolating the several terpene compounds in their pure state. Thus, for example, turpentine oils which contain both alpha and beta pinene can be used according to the invention.

According to the present invention, it has been further found that the reaction of beta pinene alone, in particular, with $H_2S$ in the presence of ultraviolet light is considerably faster than the reaction of other pinenes including pinene mixtures and at the same time a higher purity product is obtained.

Also, according to the invention, new compositions of matter are produced from pinene feeds by contacting such feeds with $H_2S$ in the presence of ultraviolet light. Specifically, a reaction product containing as the principal mercaptan component 10-mercaptopinane, a novel composition, having the structural formula

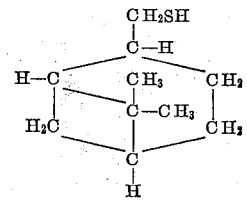

has been produced from beta-pinene.

The hydrogen sulfide employed for reaction with the bicyclic terpene compounds of the invention can be in the liquid state if the pressure is high enough and the temperature relatively low. The hydrogen sulfide is generally present in excess on a molar basis as compared to the bicyclic terpene compound or compounds. The amount of hydrogen sulfide employed will vary appreciably and generally for most applications will be in the range between about 2 and about 10 mols of hydrogen sulfide per mol of terpene reactant.

Although the reaction described herein can be carried out by using the whole range of ultraviolet radiations, that is, wave lengths in the range of 100 to 3800 Angstrom units, ultraviolet radiation having wave lengths below about 290 Angstrom units are preferred. The amount of radiation can vary over a wide range and will be dependent upon other factors, such as the particular terpene compound used as the reactant and the amount thereof, the source of radiation, and other considerations. Generally, however, the rate of ultraviolet radiation, expressed in terms of REP (Roentgen equivalent physical) per hour will be in the range between $1 \times 10^3$ to $1 \times 10^{10}$, and the total radiation or dosage will generally be in the range between $1 \times 10^5$ and $1 \times 10^{11}$ REP. Any suitable source of radiation providing wave lengths in the ultraviolet range can be used, including such common sources as mercury lamps and hydrogen discharge tubes. The particular reaction vessel should be transparent in part or whole to ultraviolet radiation of the desired wave length and materials such as Vycor and quartz can be used.

The unsaturated terpene compounds or mixtures thereof are treated with hydrogen sulfide under the influence of ultraviolet light according to the invention under suitable reaction conditions. The reaction of this invention can be carried out in a manner like that of the prior art and can be effected in a batch, intermittent or continuous manner. The terpene compound can be dissolved in a nonreactive solvent, for example, benzene, toluene, butanol, gasoline, etc., or if the terpene compound is liquid at the temperature employed it can be used without a solvent. Hydrogen sulfide is passed through the liquid terpene reactant or terpene solution until the reaction is substantially completed, for example, for a period varying from ½ to 72 hours or more, preferably from about 1 to about 10 hours, depending upon the conditions of reaction. The reaction temperature can vary over a wide range and generally will range from about $-50$ to about 300° F. The pressure at which the reaction is carried out will also vary and generally will be sufficient to maintain liquid phase conditions although vapor phase or mixed phase conditions are contemplated. The pressure can, accordingly, vary from about atmospheric to about 1000 atmospheres, although these limits are in no way critical.

No special form of apparatus is required to carry out the reaction in accordance with this invention. When atmospheric pressure is used, the reaction can be carried out in an open vessel, while reaction under superatmospheric pressure can be carried out in, for example, an autoclave or other suitable means.

In actual operation, it is preferred to exclude air from the reaction mass in order to avoid oxidation of the mercaptans as formed. The same result can be accomplished by adding an antioxidant, for example, hydroquinone, alpha-naphthol, etc., to the reaction mixture. The presence of antioxidant will also tend to prevent oxidation of the mercaptan after formation and during storage, shipment, etc. On the other hand, if it is desired to produce terpene sulfides, the terpene mercaptans can be oxidized to sulfides as they are formed by introducing air or oxygen to the reaction zone along with the hydrogen sulfide or independently.

After the reaction is completed, the products of reaction can be recovered by any well known separation procedure. For example, gases can be recovered or released to the atmosphere and the liquid fractionated, distilled, crystallized or subjected to various separation and recovery procedures to obtain the desired mercaptan product.

The thiols derived from the bicyclic terpene compounds according to the invention have a wide variety of usages in industry. For examples, the mercaptans can be used as raw materials for the production of the corresponding sulphonic acids, etc. which are of value as wetting agents, flotation agents and organic intermediates.

A better understanding of the invention can be obtained by referring to the following illustrative examples which are not intended, however, to be unduly limitative of the invention.

EXAMPLE I

A series of runs was conducted in which a feed mixture of alpha-pinene was reacted with technical grade $H_2S$ in a laboratory loop-type reactor (one leg containing a quartz well) in the presence of ultraviolet light. The alpha-pinene feed had the following composition and properties:

*Table I*

|  | Alpha-pinene |
|---|---|
| Molecular weight | 137.4 |
| Specific gravity, 20/4 C. | 0.8594 |
| Refractive index, 20/D | 1.4654 |
| Gardner color | 1 |

ASTM distillations: D–86, F. at 760 mm.
- I.B.P. ____ 303
- 5% ____ 305
- 10% ____ 305
- 20% ____ 306
- 30% ____ 307
- 40% ____ 307
- 50% ____ 307
- 60% ____ 307
- 70% ____ 307
- 80% ____ 307
- 90% ____ 309
- 95% ____ 309
- D.P. ____ 315

The above-described alpha pinene was contacted with $H_2S$ at atmospheric temperature (approximately 80° F.) in a mol ratio of $H_2S$ to alpha pinene of 3:1 and 5:1 under the influence of ultraviolet light. The reaction mixture in both of the above runs was exposed to ultraviolet light for approximately 8 hours in the quartz tube. The reactor effluent was fractionated. The mercaptan composite had the following properties:

*Table II*

|  | Pinanyl mercaptan |
|---|---|
| Molecular weight | 168.5 |
| Specific gravity, 20/4 C | 0.9780 |
| Refractive index, 20/D | 1.4086 |
| Gardner color | [1] 1 |
| Mercaptan sulfur, weight percent | 18.69 |
| Total sulfur, weight percent | 18.3 |
| Mercaptan purity, weight percent | 97.3 |

| ASTM Distillations | F. at 5 mm. | F. at 760 mm. |
|---|---|---|
| I.B.P. | 175 | 424 |
| 5% | 183 | 433 |
| 10% | 184 | 435 |
| 20% | 186 | 437 |
| 30% | 186 | 437 |
| 40% | 186 | 437 |
| 50% | 187 | 439 |
| 60% | 188 | 440 |
| 70% | 190 | 442 |
| 80% | 190 | 442 |
| 90% | 193 | 445 |
| 95% | 196 | 449 |
| D.P. |  |  |

[1] Original solution purple; fades on standing to color indicated (colorless).

The conversion per pass with the ultraviolet process of the invention ranged from 25 to 35 weight percent using $H_2S$ to olefin mol ratios of 3:1 and 5:1 and a reaction time of 8 hours. The ultimate yield was estimated to be about 90 mol percent based on pinene. The purity of the mercaptan separated from the reaction mixture was 97.3 weight percent based on a chromatographic analysis. The mercaptan product obtained by the ultraviolet light activated reaction of the invention was analyzed and found to contain 3 mercaptan isomers present in 51.9, 44.1 and 1.3 weight percent ratio. Purity calculated by conventional method, mercaptan sulfur and mol weight, was 98.6 weight percent. From the above it can be seen that no side reaction products were produced since no light components were indicated in the chromatogram other than alpha-pinene. This is an indication of how clean the ultraviolet light reaction of the invention is in comparison with other known processes wherein many isomers are obtained along with a low purity mercaptan product.

It can be seen from the above example that a very valuable pinanyl mercaptan product can be readily produced according to the invention.

EXAMPLE II

A series of runs was conducted in which a feed mixture of B-pinene [1] was reacted with $H_2S$ in a laboratory-type ---
[1] B-pinene-β-pinene.

reactor in the presence of ultraviolet light. The B-pinene feed had the following composition and properties.

*Table III*

| | B-pinene |
|---|---|
| Refractive index, 20/D | 1.4780 |
| Specific gravity, 20/4 | 0.8702 |
| Mol weight | 134.5 |
| Total sulfur, weight percent | --- |
| Mercaptan Sulfur, weight percent | --- |
| Color, Saybolt | +30 |
| Bormine number | 181 |

| Distillation, | D-86, F. |
|---|---|
| I.B.P. | 322 |
| 5 percent condensed | 323 |
| 10 percent condensed | 323 |
| 20 percent condensed | 325 |
| 30 percent condensed | 325 |
| 40 percent condensed | 325 |
| 50 percent condensed | 325 |
| 60 percent condensed | 325 |
| 70 percent condensed | 326 |
| 80 percent condensed | 327 |
| 90 percent condensed | 327 |
| 95 percent condensed | 331 |
| E.P. | 355 |

| Composition: | Wt. percent |
|---|---|
| α-Pinene | 6.2 |
| Unidentified | 1.4 |
| B-pinene | 91.2 |
| Unidentified | 0.2 |
| Unidentified | 0.8 |
| Heavies | 0.2 |

The above described B-pinene feed was contacted with technical grade $H_2S$ at different ratios of $H_2S$ to olefin (pinene) at atmospheric temperature (approximately 80° F.) under the influence of ultraviolet light. Two runs were made at 10 to 1 mol ratio of $H_2S$ to pinene with and without two volume percent trimethyl phosphite, based on pinene, added as a reaction promoter. One run was made at a mol ratio of $H_2S$ to olefin (pinene) of 5.

The UV reactor is of the thermal siphon type having a capacity of 6,100 ml., and is equipped with a 1,200 watt UV light bulb. In making a run, the pinene was charged to the reactor, then the $H_2S$ was added to the desired level, and the UV light was turned on. Samples of reaction product were withdrawn at various intervals and analyzed for mercaptan sulphur.

The reaction product from all three runs noted above with B-pinene were composited and distilled in a 1¼-inch ID by one 1-foot long column packed with protruded packing. The distillation data are shown in the following table.

*Table IV*

DISTILLATION DATA [1] FOR CRUDE PINANYL MERCAPTAN MADE FROM B-PINENE BY UV PROCESS

| Cut | Temperature, F. | | | Volume, ml. | | Press., mm. Hg | Volume Percent [2] | Mercaptan Sulfur, Weight Percent |
|---|---|---|---|---|---|---|---|---|
| | Overhead | Corr Overhead | Kettle | Cut | Cumulative | | | |
| I.B.P. | 140 | 307 | 248 | --- | --- | 28 | --- | --- |
| 1 | 138 | 310 | 247 | 100 | 100 | 25 | 2.3 | --- |
| 2 | 140 | 311 | 254 | 100 | 200 | 25 | 4.5 | --- |
| 3 | 170 | 357 | 255 | 100 | 300 | 20 | 6.8 | 0.3 |
| 4 | 212 | 440 | 246 | 100 | 400 | 10 | 9.1 | 11.7 |
| 5 | 218 | 448 | 244 | 100 | 500 | 10 | 11.3 | 16.7 |
| 6 | 199 | 453 | 240 | 200 | 700 | 5.0 | 15.8 | 18.2 |
| 7 | 177 | 462 | 229 | 200 | 900 | 2.0 | 20.3 | 18.4 |
| 8 | 178 | 463 | 227 | 200 | 1,100 | 2.0 | 24.9 | 18.6 |
| 9 | 178 | 463 | 234 | 200 | 1,300 | 2.0 | 29.4 | 18.6 |
| 10 | 179 | 464 | 235 | 200 | 1,500 | 2.0 | 34.0 | --- |
| 11 | 179 | 464 | 237 | 200 | 1,700 | 2.0 | 38.5 | 18.7 |
| 12 | 178 | 463 | 240 | 200 | 1,900 | 2.0 | 43.0 | --- |
| 13 | 178 | 463 | 242 | 200 | 2,100 | 2.0 | 47.5 | 18.7 |
| 14 | 178 | 463 | 235 | 200 | 2,300 | 2.0 | 52.1 | --- |
| 15 | 178 | 463 | 242 | 200 | 2,500 | 2.0 | 56.6 | 18.7 |
| 16 | 178 | 463 | 245 | 200 | 2,700 | 2.0 | 61.1 | --- |
| 17 | 179 | 464 | 250 | 200 | 2,900 | 2.0 | 65.8 | 18.7 |
| 18 | 178 | 463 | 255 | 200 | 3,100 | 2.0 | 70.3 | --- |
| 19 | 167 | 473 | 264 | 200 | 3,300 | 1.0 | 74.8 | 18.7 |
| 20 | 167 | 473 | 286 | 200 | 3,500 | 1.0 | 79.2 | --- |
| 21 | 178 | 523 | 323 | 106 | 3,606 | 0.5 | 81.7 | 18.4 |
| 22 | 225 | 585 | 334 | 24 | 3,630 | 0.5 | 82.2 | 21.9 |
| Trap | | | | 7 | 3,637 | | | |
| Kettle Product | (0.693 lb.) | | | 785 | 4,422 | | | |

[1] Charged 4,500 ml. (9.660 lb.) to 1¼-inch I.D. by 1-foot long column packed with ¼-inch protruded packing.
[2] On 100 percent recovery basis. Actual recovery was 98.4 volume percent.

A material balance for the three runs is shown in the following table.

*Table V*

MATERIAL BALANCE [1] FOR SYNTHESIS OF PINANLY MERCAPTAN FROM B-PINENE

| | Ml. | G. | Equivalent Moles | Mole percent |
|---|---|---|---|---|
| A. Charge (3 runs): | | | | |
| Olefin | 5,850 | 5,100 | 37.5 | 100 |
| Hydrogen Sulfide | 12,450 | 9,860 | 290.0 | --- |
| B. Crude Products Recovered | 6,230 | 6,080 | | |
| C. Products Recovered by Distillation: | | | | |
| Recycle Olefin | 615 | 554 | 4.1 | 10.9 |
| Pinanyl Mercaptan | 4,446 | 4,360 | 26.0 | 69.5 |
| Heavies (Sulfide) | 1,050 | 1,135 | 7.4 | 19.6 |
| Loss | 119 | 31 | | |
| Total | 6,230 | 6,080 | 37.5 | 100.0 |
| D. Yield: [2] | | | | |
| Mole percent | | | | 69.5 |
| Pounds pinanyl mercaptan/lb. olefin charged | | | | 0.86 |

[1] Based on olefin.
[2] Actual recovery of mercaptan of 99.2 weight percent purity.

A composite made of distillation cuts 5–21 of Table IV above has the following properties.

*Table VI*

MERCAPTAN COMPOSITE [1]

| | |
|---|---|
| Refractive index, 20/D | 1.5086 |
| Specific gravity, 20/4 | 0.9817 |
| Mole weight | 169 |
| Total sulfur, wt. percent | 18.1 |
| Mercaptan sulfur, wt. percent | 18.7 |
| Gardner Color | 1 |

| Distillation | °F. at 5 mm. Hg | °F. at 760 mm. Hg |
|---|---|---|
| I.B.P | 168 | 417 |
| 5% condensed | 192 | 448 |
| 10% | 194 | 450 |
| 20% | 195 | 451 |
| 30% | 196 | 453 |
| 40% | 196 | 453 |
| 50% | 197 | 454 |
| 60% | 197 | 454 |
| 70% | 197 | 454 |
| 80% | 197 | 454 |
| 90% | 197 | 454 |
| 95% | 198 | 455 |
| E.P | | |

Composition, wt. percent:
| | |
|---|---|
| α-Pinene | 0.5 |
| β-Pinene | 0.1 |
| Unidentified | 0.2 |
| Pinanyl mercaptan | 99.2 |

[1] Cuts 5 thru 21 of Table IV.

The distillation data in Table IV noted above show that there is no problem in making pinanyl mercaptan of high purity by distillation of the reaction product in a distillation column having the equivalent of ten to twelve plates. The single isomer purity (Table VII) reached a maximum of 99.6 weight percent in cut 19. The mercaptan purity of the composite, which included cuts 5 through 21, was 99.2 weight percent. The single isomer purity of the composite was 98 weight percent.

Chromatographic analyses * of various cuts are set forth in the following table:

*Table VII*

| Cut Number | 5 | 6 | 7 | 12 | 17 | 19 | Composite [1] |
|---|---|---|---|---|---|---|---|
| α-Pinene [2] | 5.4 | 1.9 | 0.7 | | | | 0.5 |
| β-Pinene | Tr | 0.2 | 0.1 | | | | 0.1 |
| Unidentified Total Amount, Wt. Percent | 3.9 | 0.9 | 0.1 | 0.6 | 0.3 | 0.4 | 0.2 |
| Pinanyl Mercaptan: | | | | | | | |
| 1 | 1.1 | 0.6 | Trace | | | | Trace |
| 2 | 2.7 | 2.2 | 1.7 | 0.4 | | | 0.5 |
| 3 | 2.4 | 2.4 | 2.1 | 1.0 | 0.3 | | 0.7 |
| 4 [3] | 84.5 | 91.8 | 95.3 | 98.0 | 99.4 | 99.6 | 98.0 |
| Total | 100.0 | 100.0 | 100.0 | 100.0 | 100.0 | 100.0 | 100.0 |

[1] The composite included cuts 5–21 of Table IV.
[2] Identification tentative.
[3] This isomer is believed to be 10-mercaptopinane.

NOTE: See Table IV for distillation data and identification of the cuts.

*Ucon column, 2 meter length; Food Machinery chromatograph No. 3, Programmed 100–250 C.

The material balance in Table V shows that the reaction product was composed of the following:

| | Mole percent |
|---|---|
| Recycle olefin | 10.9 |
| Pinanyl mercaptan | 69.5 |
| Sulfide | 19.6 |

It was observed from the above described runs that the reaction rate was essentially the same for all three runs with beta-pinene. It was also observed that the reaction rate for beta-pinene was approximately 10 times as fast as was obtained with alpha-pinene.

An NMR examination of the reaction product revealed that the mercaptan component was 10-mercaptopinane, as noted in footnote 3 of Table VII.

Reasonable variation and modification are possible within the scope of the foregoing disclosure and appended claims to the invention, the essence of which is that there have been provided a pinanyl mercaptan composition comprising 10-mercaptopinane and a method for preparing high purity cyclic thiols in high yields comprising contacting a mono-unsaturated bicyclic terpene compound, preferably alpha- and beta-pinene, more preferably beta-pinene, with $H_2S$ in the presence of ultraviolet light.

We claim:

1. A process for the preparation of a pinanyl mercaptan of at least about 95 percent purity which comprises contacting beta pinene with $H_2S$ in a mol ratio of $H_2S$ to beta-pinene of 2:1 to 10:1 at a temperature in the range −50 to 300° F. in the presence of ultraviolet light for a period of time ranging from 1 to about 10 hours to form said mercaptan, and recovering as a product of the process said pinanyl mercaptan.

2. The process of claim 1 wherein said contacting is carried out in the presence of trimethyl phosphite as a reaction promoter.

3. A process for the preparation of high purity 10-mercaptopinane which comprises contacting a beta-pinene feed with $H_2S$ in the presence of ultraviolet light, and distilling the reaction product thus formed to recover 10-mercaptopinane.

References Cited by the Examiner

UNITED STATES PATENTS

| | | | |
|---|---|---|---|
| 2,076,875 | 4/1937 | Borglin et al. | 260—139 |
| 2,398,479 | 4/1946 | Vaughan et al. | 204—158 |
| 2,411,961 | 12/1946 | Evans et al. | 204—162 |
| 2,938,928 | 5/1960 | Stevenson et al. | 260—609 |
| 3,019,267 | 1/1962 | Mahan et al. | 204—162 |
| 3,025,327 | 3/1962 | May et al. | 260—609 |
| 3,085,955 | 4/1963 | Louthan | 204—162 |

JOHN H. MACK, *Primary Examiner.*

WINSTON A. DOUGLAS, HOWARD S. WILLIAMS,
*Examiners.*